United States Patent [19]

Frazier et al.

[11] 4,370,656
[45] Jan. 25, 1983

[54] USE OF BISTATIC RADAR SYSTEM FOR DETERMINING DISTANCE BETWEEN AIRBORNE AIRCRAFT

[75] Inventors: Lawrence M. Frazier, West Covina; Benjamin G. Lewis, Corona, both of Calif.

[73] Assignee: General Dynamics, Pomona Division, Pomona, Calif.

[21] Appl. No.: 200,660

[22] Filed: Oct. 27, 1980

[51] Int. Cl.³ .............................................. G01S 5/10
[52] U.S. Cl. ............................. 343/112 D; 343/12 R
[58] Field of Search ......................... 343/12 R, 112 D

[56] References Cited

U.S. PATENT DOCUMENTS

| | | | |
|---|---|---|---|
| 2,134,535 | 10/1938 | Runge | 343/112 D X |
| 2,837,738 | 6/1958 | Valkenburgh | 343/12 R X |
| 3,721,986 | 3/1973 | Kramer | 343/112 D X |
| 3,939,476 | 2/1976 | Leopard et al. | 343/112 D X |

*Primary Examiner*—T. H. Tubbesing
*Attorney, Agent, or Firm*—Neil F. Martin; Edward W. Callan; Edward B. Johnson

[57] ABSTRACT

A bistatic passive radar system and method for airborne use in a first aircraft in conjunction with a host transmitter located in a second aircraft that may be at a different altitude than the first aircraft, characterized by a system and method for determining the distance between the aircraft. The system for determining the distance between the aircraft includes a system for receiving radar signals from the host transmitter directly and via reflection from a selected ground target located between the two aircraft; a system coupled to the receiver for determining the apparent range $R_a$ from the host transmitter on the second aircraft to the receiver on the first aircraft in response to receipt of the radar signals; a device on the first aircraft for determining the altitude H of the first aircraft; a device on the first aircraft for determining the angle $\theta$ with respect to vertical at which the radar signals are received directly from the host transmitter; a device on the first aircraft for determining the angle $\phi$ with respect to vertical at which the reflected radar signals from the ground are received; and a computer system on the first aircraft for computing the distance D between the two aircraft from the determined values of $R_a$, H, $\theta$ and $\phi$. The system further includes an alphanumeric display device coupled to the computer system for providing an alphanumeric readout of the computer value of the distance D between the aircraft.

6 Claims, 2 Drawing Figures

USE OF BISTATIC RADAR SYSTEM FOR DETERMINING DISTANCE BETWEEN AIRBORNE AIRCRAFT

BACKGROUND OF THE INVENTION

The present invention generally pertains to radar systems and is particularly directed to an improvement in bistatic passive radar systems for enabling determination of the distance between two airborne aircraft. Ordinary (monostatic) radar systems have a transmitter and a receiver located at the same site. The transmitter emits electromagnetic radiation signals having a time reference base, such as pulses (radar signals), and the receiver detects reflected radiation from targets illuminated by the transmitted radar signal. The range of the target may be determined by the time it takes a pulse of a electromagnetic radiation to travel from the transmitter to the target and then by reflection from the target back to the receiver. The transmitted pulses are focused in a narrow beam, and the bearing of the target is determined by the bearing of the transmitter's antenna at the time the reflected pulse is received.

When used in military aircraft, monostatic radar has the disadvantage that the transmitter can be detected at long range (hundreds of miles) by the electromagnetic pulses it emits. This allows the enemy to detect the presence of an aircraft and also to determine its bearing. To get around this disadvantage, bistatic passive radar was developed. Bistatic passive radar does not have a transmitter but rather has a receiver system that utilizes the radiation emitted by any monostatic radar system in its reception area. The transmitter of a monostatic radar system which is being used by a bistatic passive radar system is known as the host transmitter. In a bistatic passive radar the system locks onto the host transmitter's pulse train, measures the rotational speed of its antenna and its bearing angle, and typically generates a plan position indicator (PPI) display from this data. Target returns are displayed on the PPI display which has the host transmitter as its center. The present invention does not depend upon or utilize rotational speeds, azimuth bearing angles or PPI display.

With bistatic passive radar systems, the distance between the host transmitter and the bistatic radar system cannot be determined by a simple time measurement as with a monostatic radar system, because real time data indicating when the radar signal was transmitted is not available to the bistatic radar system.

Systems that purportedly determine the distance between two airborne aircraft wherein a first aircraft contains a bistatic passive radar system and the other aircraft contains a host transmitter have been described in U.S. Pat. Nos. 2,837,738 to Van Valkenburgh and 3,939,476 to Leopard et al. In these systems, the distance between the two aircraft is said to be determined by measuring (1) the interval between receipt by the bistatic radar system transmitted radar signals received directly from the host transmitter and receipt by the bistatic radar system of radar signals that are reflected from the ground; (2) the altitude of the first aircraft; and (3) the angle of elevation of the second aircraft from the first aircraft, and by computing the distance from these measurements. However, these systems are not always accurate because the computations are based upon insufficient measured data.

SUMMARY OF THE INVENTION

The present invention is an improved bistatic passive radar system and method for airborne use in a first aircraft in conjunction with a host transmitter located in a second aircraft that may be at a different altitude than the first aircraft, characterized by an improved system and method for determining the distance between the aircraft. In accordance with the present invention, the system for determining the distance between the aircraft includes a system for receiving radar signals from the host transmitter directly and via reflection from a selected ground target located between the two aircraft; a system coupled to the receiver for determining the apparent range $R_a$ from the host transmitter to the receiver on the first aircraft in response to receipt of the radar signals; a device on the first aircraft for determining the altitude H of the first aircraft; a device on the first aircraft for determining the angle $\theta$ with respect to vertical at which the radar signals are received directly from the host transmitter; a device on the first aircraft for determining the angle $\phi$ with respect to vertical at which the reflected radar signals are received; and a computer system on the first aircraft for computing the distance D between the aircraft from the determined values of $R_a$, h, $\theta$ and $\phi$.

The bistatic passive radar system for the present invention includes a device coupled to the computer system for providing a alphanumeric readout of the computed value of the distance D between the two aircraft.

Additional features of the present invention are discussed in relation to the description of the preferred embodiment.

DESCRIPTION OF THE PREFERRED EMBODIMENT

Figure 1:
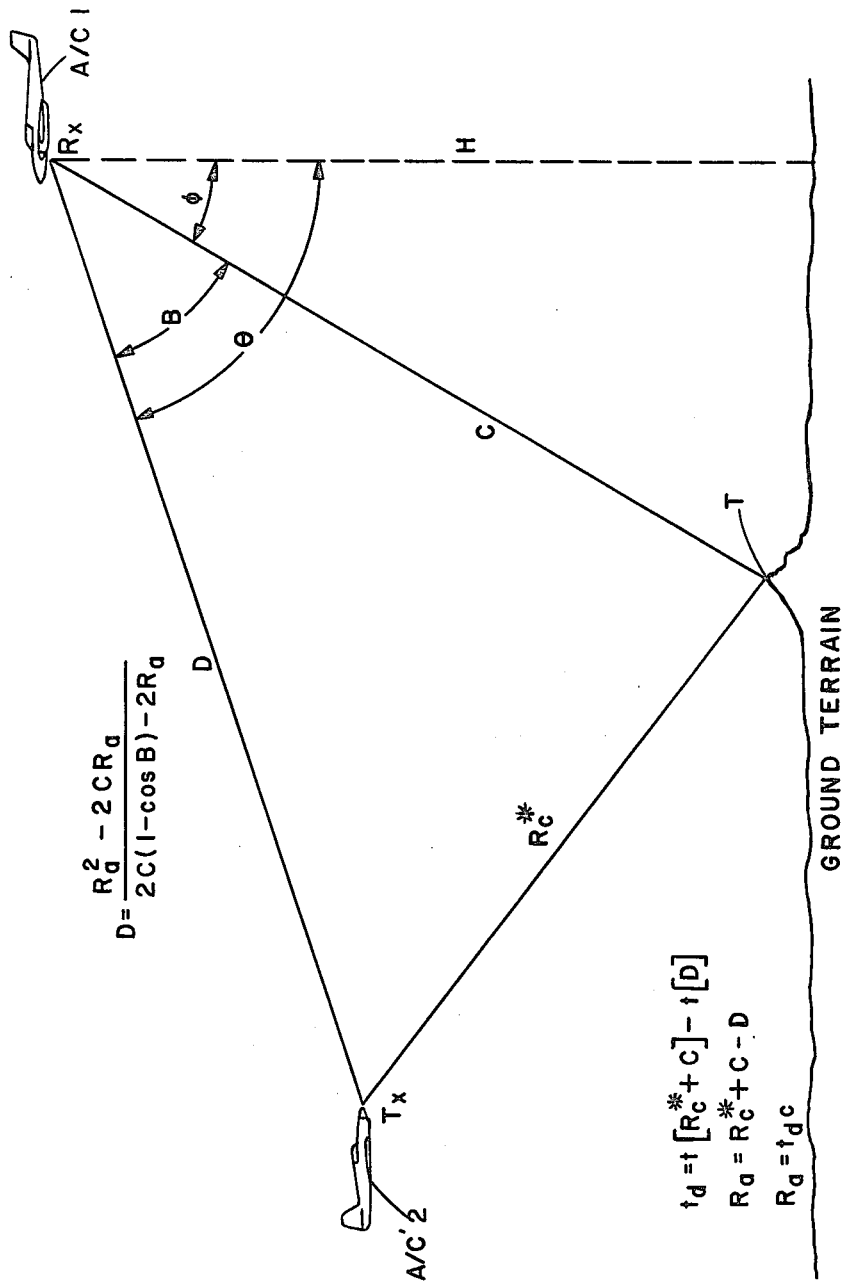
FIG. 1 illustrates the relative positions of the aircraft respectively containing the bistatic passive radar system and the host transmitter, the paths of the radar signals, and the geometric parameters that are measured to determine the range between the aircraft.

Referring to FIG. 1, the bistatic passive radar system $R_x$ is located in a first aircraft A/C-1 for use in conjunction with a host transmitter $T_x$ that is located in a second aircraft A/C-2. The two aircraft may be at the same altitude, or at different altitudes as shown in FIG. 1. The two aircraft may be approaching each other or they may be passing by each other. At the time the distance determination is made the separation D between the aircraft A/C-1 and A/C-2 should be within the horizon. The host transmitter may be part of either a scanning or a non-scanning radar system. The radar signals typically are pulsed signals. However, the system of the present invention is operable with other types of radar signals, provided that the radar signals have a time reference, such as frequency modulated (FM) continuous wave signals, frequency shift keyed (FSK) modulated signals, or other repetitive coded modulated signals.

The bistatic passive radar system $R_x$ includes a receiver system, such as a passive wideband monopulse tracker, for receiving radar signals from the host transmitter $T_x$ directly along path D and via reflection from a selected ground target T along path $R_c^* + C$. D is the distance between the aircraft. $R_c^*$ is the correct range from the host transmitter to the selected ground target. C is the distance from the selected ground target T to the bistatic passive radar receiver $R_x$ in the first aircraft A/C-1. The ground target T is selected by pointing the monopulse tracker at some point on the ground about midway between the aircraft where a strong ground clutter reflection is obtained.

Figure 2:
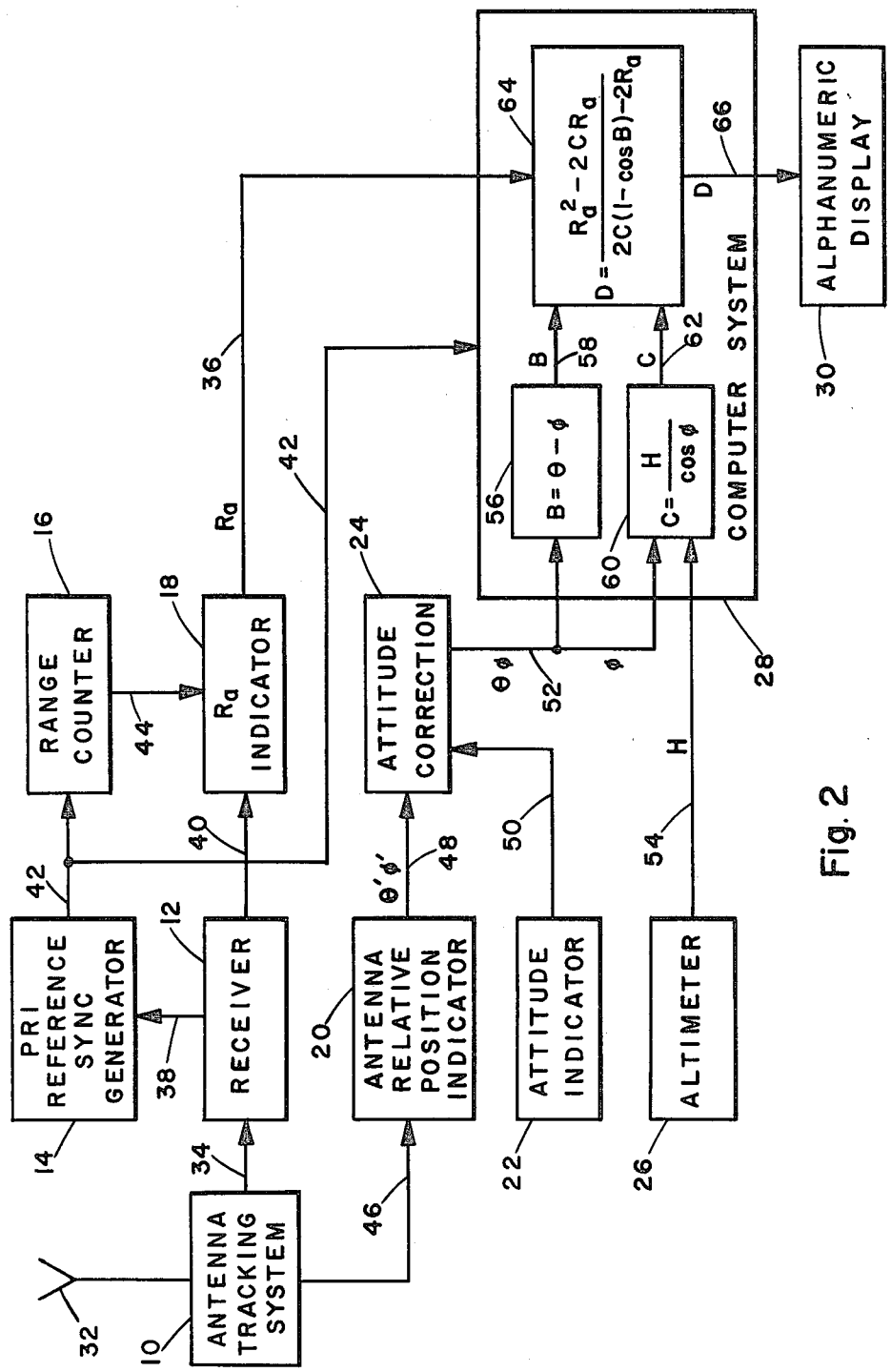
FIG. 2 is a schematic block diagram of the bistatic passive radar system of the present invention.

Referring to FIG. 2, the preferred embodiment of the bistatic passive radar system of the present invention includes an antenna tracking system 10, a receiver 12, a PRI (pulse repetition interval) reference sync generator 14, a range counter 16, an $R_a$ indicator 18, an antenna relative position indicator 20, an attitude indicator 22, an attitude correction circuit 24, an altimeter 26, a computer system 28 and an alphanumeric display device 30.

The antenna tracking system 10 is a passive wideband monopulse tracker that includes an electronically scanned antenna 32. Received radar signals are provided on line 34 to the receiver 12, which is a monopulse receiver.

The $R_a$ indicator 18 provides an $R_a$ signal on line 36 that is representative of the apparent range $R_a$ from the transmitter $T_x$ to the receiver 12 at location $R_x$. The apparent range $R_a$ is determined by measuring the time interval $t_d$ between receipt by the receiver 12 of a radar signal received directly from the transmitter $T_x$ along path D and receipt by the receiver 12 of a radar signal received via reflection from the selected target along the path $R_c^*$ and C.

$$t_d = t[R_c^* + C] - t[D] \tag{1}$$

The apparent range $R_a$ is:
$$R_a = R_c^* + C - D, \tag{2}$$

Therefore, the relationship of the apparent range $R_a$ to the time interval $t_d$ is:

$$R_a = t_d c \tag{3}$$

wherein c is the propagation speed of the radar signals, which is the same as the speed of light.

The time interval $t_d$ is measured by the $R_a$ indicator 18 as follows to provide the $R_a$ signal on line 36. Upon the receipt of each direct radar pulse by the receiver 12, signals are provided on line 38 to the PRI reference sync generator 14 and on line 40 to the $R_a$ indicator. The PRI reference sync generator 14 distinguishes the signals on line 38 that are received periodically as being derived from the radar signals that are received directly from the host transmitter $T_x$ and provides a synchronizing pulse on line 42 to the range counter 16 each time a radar pulse is received directly from the host transmitter $T_x$.

The range counter 16 is reset to zero each time a synchronizing pulse is provided on line 42. The range counter counts at the rate of 1 million pulses per second and continuously provides a count signal indicating the accumulated count on line 44 to the $R_a$ indicator 18. Each time a signal is provided on line 40 from the receiver 12 to the $R_a$ indicator 18, the $R_a$ indicator 18 provides an $R_a$ signal on line 36 that indicates the count provided by the range counter 16. Since the range counter 16 is reset to zero each time a radar signal is received directly from the host transmitter $T_x$, a count is provided on line 44 to the $R_a$ indicator 18 only when the signal on line 40 is provided at the end of the interval $t_d$ in response to a radar signal that is reflected from the selected target T. Thus, the count indicated by the $R_a$ signal on line 36 is a measure of the time interval $t_d$ and is representative of the apparent range $R_a$.

The antenna relative position indicator 20 is coupled to the antenna tracking system 10 via line 46 for providing an indication of the bearing of the antenna 32 with respect to the first aircraft A/C-1 each time a radar signal is received, first directly from the host transmitter $T_x$ and second from the selected ground target T. In addition to an azimuth indication (which is not used in determining the distance D between the aircraft) the antenna relative position indicator provides on line 48 a signal $\theta'$, which indicates the vertical bearing of the antenna 32 with respect to the aircraft when a radar signal is received directly from the host transmitter $T_x$, and a signal $\phi'$, which indicates the vertical bearing of the antenna 32 with respect to the aircraft when a reflected radar signal is received from the selected target T.

It is necessary to correct these signals $\theta'$ and $\phi'$ in view of the attitude of the aircraft A/C-1 at the time the respective radar signals are received. Accordingly, the $\theta'$ and $\phi'$ signals on line 48 are provided to an attitude correction circuit 24, which also receives signals on line 50 from the attitude indicator 22 for indicating the attitude of the first aircraft A/C-1. The attitude correction circuit 24 corrects the signals $\theta'$ and $\phi'$ on line 48 in response to the attitude indication signals on line 50 to provide corrected $\theta$ and $\phi$ signals on line 52 to the computer system 28.

The $\theta$ signal on line 52 indicates the angle $\theta$ with respect to the vertical (FIG. 1) at which radar signals are received directly from the host transmitter $T_x$. The $\phi$ signal on line 52 indicates the angle $\phi$ with respect to vertical at which reflected radar signals are received from the selected ground target T.

The altimeter 26 determines the altitude H of the first aircraft A/C-1 and provides an H signal on line 54 for indicating the altitude H of the first aircraft.

The computer system 28 computes the distance D between the aircraft from the determined values of $R_a$, H, $\theta$ and $\phi$ represented by the signals on lines 36, 52 and 54.

The equation solved by the computer system 28 for determining the distance D is derived with reference to FIG. 1 as follows:

$$R_c^{*2} = C^2 + D^2 - 2CD \cos B \tag{4}$$

wherein B is the vertical angle between the line of sight from the first aircraft A/C-1 to the second aircraft A/C-2 and a line from the selected ground target T to the first aircraft A/C-1.

With reference to equation (2), above, $$R_c^* = R_a - C + D \tag{5}$$

$$R_c^{*2} = R_a^2 - 2CR_a + 2DR_a + C^2 - 2CD + D^2 \tag{6}$$

Combining equations (4) and (6) yields:

$$-2CD \cos B = R_a^2 - 2CR_a + 2DR_a - 2CD \tag{7}$$

$$D = \frac{R_a^2 - 2CR_a}{-2C \cos B - 2R_a + 2C}, \text{ or} \tag{8}$$

$$D = \frac{R_a^2 - 2CR_a}{2C(1 - \cos B) - 2R_a} \quad (9)$$

The computer system 28 contains a first unit 56 for computing the vertical angle B by computing the difference between the values of $\theta$ and $\phi$ indicated by the respective $\theta$ and $\phi$ signals provided on line 52. The $\theta$ and $\phi$ signals are provided on line 52 at different times corresponding to when the antenna 32 is directed to the host transmitter $T_x$ and the selected ground target T, respectively. The $\theta$ and $\phi$ signals on line 52 are distinguished from each other by the computer system 28 in response to the synchronizing pulse signal provided on line 42 by the PRI reference sync generator 14. The $\theta$ signal is provided on line 52 coincident with the synchronizing pulse signal being provided on line 42. The first unit 56 provides a B signal on line 58 for indicating the vertical angle B.

The computer system 28 includes a second unit 60 for computing the distance C from the ground target T to the first aircraft A/C-1 by dividing the determined value of the altitude H indicated by the signal on line 54 by cosine $\phi$ in accordance with the value of $\phi$ indicated by the signal on line 52. The $\phi$ signal on line 52 is distinguished from the $\theta$ signal on line 52 in that the $\phi$ signal is provided when the synchronizing pulse signal is not provided on line 42. The second unit 60 provides a C signal on line 62 for indicating the distance C.

The computer system 28 includes third unit 64 for computing the distance D between the aircraft in accordance with equation (9) in response to the $R_a$, B and C signals respectively provided on lines 36, 58 and 62. The third unit 64 provides a D signal on line 66 for indicating the distance D.

The first, second and third computer units 56, 60, 64 are not necessarily separate units. The computations performed by these units typically are performed by a single arithmetic computation unit in the computer system 28. The units 56, 60 and 64 are described as separate units herein merely to better illustrate the order and discreteness of the computations performed within the computer system 28.

The alphanumeric display 30 is coupled to the computer system 28 for providing an alphanumeric readout of the distance D between the aircraft in response to the D signal one line 66. Alternatively, or additionally, the D signal on line 66 may be provided to another computer (not shown) associated with the ESM (electronic signal measurement) system of the first aircraft.

We claim:

1. A bistatic passive radar system for airborne use in a first aircraft in conjunction with a host transmitter located in a second aircraft that may be at a different altitude than the first aircraft, characterized by means for determining the distance between the aircraft comprising
    means for receiving radar signals from the host transmitter directly and via reflection from a selected ground target located between the two aircraft;
    means coupled to the receiving means for determining the apparent range $R_a$ from the host transmitter to the receiving means in response to receipt of said radar signals;
    means for determining the altitude H of the first aircraft;
    means for determining the angle $\theta$ with respect to vertical at which the radar signals are received directly from the host transmitter and for determining the angle $\phi$ with respect to vertical at which the reflected radar signals are received; and
    means for computing the distance D between the aircraft from the determined values of $R_a$, H, $\theta$ and $\phi$.

2. A system according to claim 1, wherein the computing means comprises means for computing the vertical angle B between the line of sight from ther first aircraft to the second aircraft and a line from the ground target to the first aircraft by computing the difference between the determined values of $\theta$ and $\phi$;
    means for computing the distance C from the ground target to the first aircraft by dividing the determined value of the altitude H by cosine $\phi$; and
    means for computing the distance D between the aircraft in accordance with the equation:

$$D = \frac{R_a^2 - 2CR_a}{2C(1 - \cos B) - 2R_a}$$

3. A system according to claims 1 or 2 further comprising means coupled to the computing means for providing an alphanumeric readout of the computed value of the distance D between the aircraft.

4. A method of using a bistatic passive radar system located in a first airborne aircraft in conjunction with a host transmitter located in a second airborne aircraft that may be at a different altitude than the first aircraft, characterized by determining the distance between the aircraft by the steps of:
    (a) receiving radar signals from the host transmitter directly and via reflection from a selected ground target located between the two aircraft;
    (b) determining the apparent range $R_a$ from the host transmitter to the first aircraft in response to receipt of said radar signals;
    (c) determining the altitude H of the first aircraft;
    (d) determining the angle $\theta$ with respect to vertical at which the radar signals are received directly from the host transmitter:
    (e) determining the angle $\phi$ with respect to vertical at which the reflected radar signals are received; and
    (f) computing the distance D between the aircraft from the determined values of $R_a$, H, $\theta$ and $\phi$.

5. A method according to claim 4, wherein step (f) comprises the steps of
    (g) computing the vertical angle B between the line of sight from the first aircraft to the second aircraft and a line from the ground target to the first aircraft by computing the difference between the determined values of $\theta$ and $\phi$:
    (h) computing the distance C from the ground target to the first aircraft by dividing the determined value of the altitude H by cosine $\phi$; and
    (i) computing the distance D between the aircraft in accordance with the equation:

$$D = \frac{R_a^2 - 2CR_a}{2C(1 - \cos B) - 2R_a} \; .$$

6. A method according to claims 4 or 5 further comprising the step of
    (j) providing an alphanumeric readout of the computed value of the distance D between the aircraft.

* * * * *